United States Patent
Zhu et al.

(10) Patent No.: US 10,372,313 B2
(45) Date of Patent: Aug. 6, 2019

(54) MOBILE CELLULAR TELEPHONE WITH A DISPLAY THAT IS CONTROLLED PARTLY BY AN INCLINE SENSOR

(75) Inventors: Dong Zhu, Vaerloese (DK); Franco Montebovi, Lund (SE)

(73) Assignee: Conversant Wireless Licensing S.a r.l., Luxembourg (LU)

(*) Notice: Subject to any disclaimer, the term of this patent is extended or adjusted under 35 U.S.C. 154(b) by 2406 days.

(21) Appl. No.: 10/572,710

(22) PCT Filed: Sep. 17, 2003

(86) PCT No.: PCT/IB03/04147
§ 371 (c)(1),
(2), (4) Date: Mar. 17, 2006

(87) PCT Pub. No.: WO2005/027550
PCT Pub. Date: Mar. 24, 2005

(65) Prior Publication Data
US 2007/0066363 A1    Mar. 22, 2007

(51) Int. Cl.
*H04M 1/00* (2006.01)
*H04B 1/38* (2015.01)
(Continued)

(52) U.S. Cl.
CPC .......... *G06F 3/0485* (2013.01); *G06F 1/1626* (2013.01); *G06F 1/1694* (2013.01); *G06F 2200/1637* (2013.01); *H04M 2250/12* (2013.01)

(58) Field of Classification Search
USPC .............................................. 455/575.1, 566
See application file for complete search history.

(56) References Cited

U.S. PATENT DOCUMENTS 6,449,857 B1    9/2002    Anikolenko ............... 33/366.11
6,690,358 B2 *  2/2004    Kaplan ......................... 345/158
(Continued)

FOREIGN PATENT DOCUMENTS

EP    1 298 893 A2    4/2003
GB    2 322 248 A     8/1998
(Continued)

OTHER PUBLICATIONS

Ken Hinckley et al. "Sensing Techniques for Mobile Interaction", 2000, ACM, UIST 2000, pp. 91-100.*

*Primary Examiner* — Edward F Urban
*Assistant Examiner* — Rui M Hu
(74) *Attorney, Agent, or Firm* — Conversant Wireless Licensing

(57) ABSTRACT

A mobile cellular telephone including an incline sensor arranged to detect inclination of the mobile telephone in a first plane. The mobile cellular telephone has an inclinometer mode, in which a processor receives an indication of the detected incline in the first plane from the incline sensor and controls a display to display an item at a position dependent upon the received indication. A mobile cellular telephone including first incline sensor means for detecting inclination of the mobile telephone when in a first orientation and second incline sensor means for detecting inclination of the mobile telephone when in a second orientation. The mobile cellular telephone has an inclinometer mode, in which a processor determines an approximate orientation of the mobile telephone from inputs from the first and second incline sensor means and automatically controls the display to display an item at a position representative of the incline for the determined orientation.

1 Claim, 3 Drawing Sheets

(51) Int. Cl.
    *G06F 3/0485*     (2013.01)
    *G06F 1/16*     (2006.01)

(56) References Cited

U.S. PATENT DOCUMENTS

| | | | |
|---|---|---|---|
| 7,158,626 B2 * | 1/2007 | Salmi et al. | 379/221.01 |
| 2003/0174307 A1 * | 9/2003 | Kalinski et al. | 356/71 |

FOREIGN PATENT DOCUMENTS

| | | |
|---|---|---|
| GB | 2 378 878 A | 2/2003 |
| WO | WO 01/43473 A1 | 6/2001 |

* cited by examiner

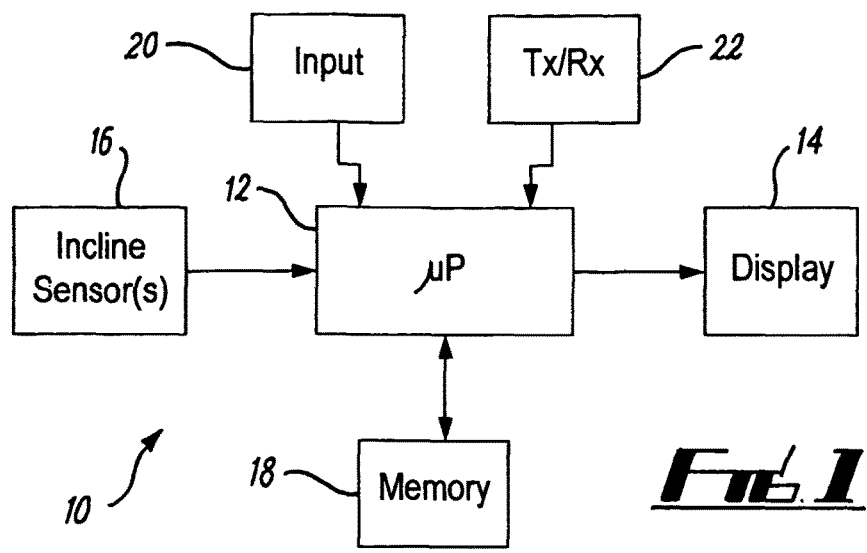
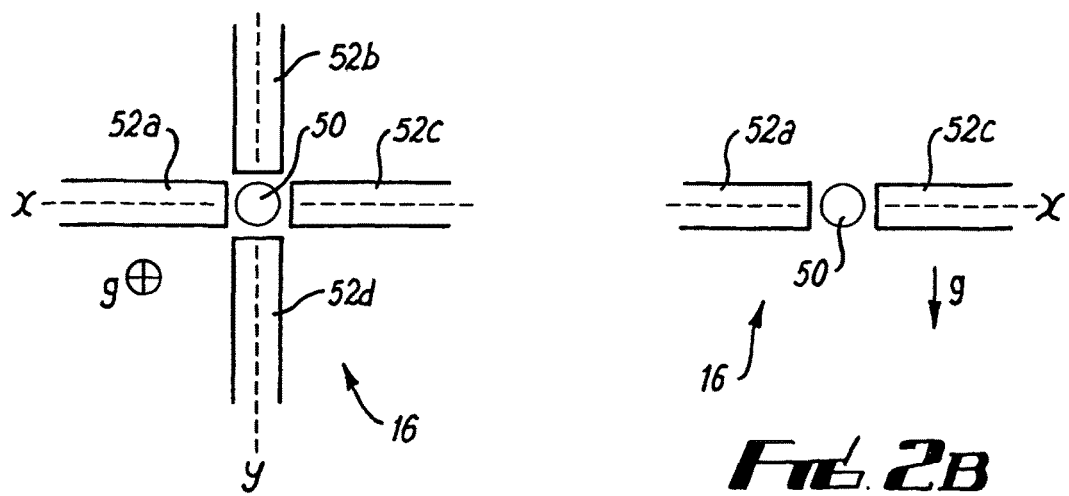

MOBILE CELLULAR TELEPHONE WITH A DISPLAY THAT IS CONTROLLED PARTLY BY AN INCLINE SENSOR

TECHNICAL FIELD

Embodiments of the invention relate to mobile cellular telephones.

BACKGROUND OF THE INVENTION

Mobile cellular telephones were at first dedicated to cellular radio communication. However, as the market for mobile telephones has developed it has been desirable to add functionality to mobile telephones to make them more useful to users. A current mobile telephone may have an address book application, an alarm clock application, a game application, a digital camera application etc.

It would be desirable to further improve the usefulness of mobile telephones to users.

It would, in particular be desirable to enable a mobile telephone to be used as a practical tool.

BRIEF SUMMARY OF THE INVENTION

According to one embodiment of the invention there is provided a mobile cellular telephone comprising: a display; a processor for controlling the operation of the mobile cellular telephone including the display; and an incline sensor arranged to detect inclination of the mobile telephone in a first plane, wherein the mobile cellular telephone has an inclinometer mode, in which the processor receives an indication of the detected incline in the first plane from the incline sensor and controls the display to display an item at a position dependent upon the received indication.

According to another embodiment of the invention there is provided a mobile cellular telephone comprising: a display; a processor for controlling the operation of the mobile cellular telephone including the display; first incline sensor means for detecting inclination of the mobile telephone when in a first orientation; and second incline sensor means for detecting inclination of the mobile telephone when in a second orientation, wherein the mobile cellular telephone has an inclinometer mode, in which the processor determines an approximate orientation of the mobile telephone from inputs from the first and second incline sensor means and automatically controls the display to display an item at a position representative of the incline for the determined orientation.

BRIEF DESCRIPTION OF DRAWINGS

For a better understanding of the present invention reference will now be made by way of example only to the accompanying drawings in which:

FIG. 1 illustrates a mobile cellular telephone;

FIG. 2A is a plan view and FIG. 2B is a cross-sectional side view of one type of incline sensor;

DETAILED DESCRIPTION OF EMBODIMENT(S) OF THE INVENTION

Figure 3A:
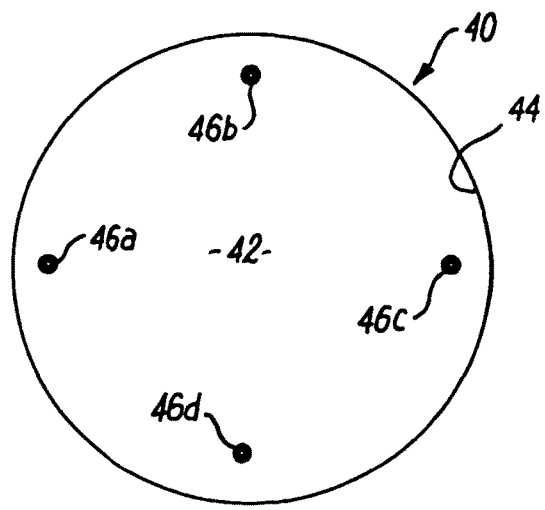
FIG. 3A is a plan view and FIG. 3B is a cross-sectional side view of another type of incline sensor.

FIG. 1 illustrates a mobile cellular telephone 10 comprising: a processor 12; a display 14 controlled by the processor 12; an incline sensor (or sensors) 16 for providing an input to the processor 12; a memory 18; a user input device 20 and a radio cellular transceiver 22.

The processor is connected to the display 14, the incline sensor(s) 16, the memory 18, the user input device 20 and the radio cellular transceiver 22. The operation of the mobile cellular telephone 10 is controlled by the processor 12 in accordance with program instructions stored in the memory 18. In particular the processor enables radio communication via the radio cellular transceiver 22, enables user control of the cellular telephone via the user input device 20 and controls the content of the display 14.

One type of incline sensor 16 is illustrated in plan view in FIG. 2A and in a cross-sectional side view in FIG. 2B. The incline sensor 16 uses a force feedback accelerometer. A mass 50 is suspended between two pairs of electromagnets 52, where each pair is aligned along a different orthogonal axis x or y. These axes x, y are orthogonal to a major axis z of the incline sensor and the incline sensor 16 detects inclines of a major plane perpendicular to the major axis i.e. it detects rotations about the x axis and the y axis. A rotation about the x axis may alternatively be described as an incline in the yz plane and a rotation about the y axis may alternatively be described as an incline in the xz plane. As the incline sensor 16 is tilted, the mass moves and power is applied to the electromagnets 52 to re-center the mass. The current required to recenter the mass for each electromagnet pair is converted to a measure of inclination of the major plane.

Figure 3B:
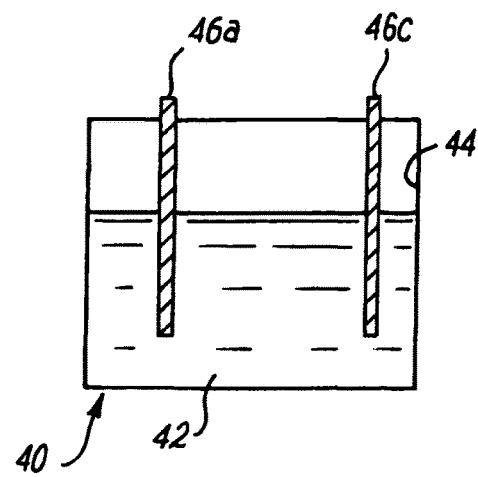

Another type of incline sensor 16 is illustrated in plan view in FIG. 3A and in a cross-sectional side view in FIG. 3B. The incline sensor 16 uses a sealed vessel 40 partially filled with a dielectric liquid 42. The interior of the vessel wall forms a common electrode 44. A first pair of electrodes 46a and 46c, aligned along a first plane, are partially immersed in the liquid near opposing sides of the vessel 40. Each electrode 46a, 46c forms a variable capacitor with the common electrode 44. The capacitance varies as the vessel is inclined in the first plane and the level of the dielectric changes asymmetrically at the opposing electrodes. The differential capacitance of the electrode pair therefore indicates the sense and the amount of inclination in the first plane. A second pair of electrodes 46b and 46c, aligned along a second plane, are partially immersed in the liquid at opposing sides of the vessel 40. Each electrode 46b, 46d forms a variable capacitor with the common electrode 44. The capacitance varies as the vessel is inclined in the second plane. The differential capacitance of the second electrode pair therefore indicates the sense and the amount of inclination in the second plane. A measurement device may be included to measure the differential capacitance of the first pair of electrodes and provide a first signal to the mobile telephone processor 12 indicative of the sense and amount of inclination in the first plane and also to measure the differential capacitance of the second pair of electrodes and provide a second signal to the mobile telephone processor 12 indicative of the sense and amount of inclination in the second plane. The incline sensor 16 has a major axis z that lies in both the first and second plane and is perpendicular to a major plane of the sensor. The incline sensor 16 detects inclination of the major plane.

Other types of incline sensor 16 may also be used.

The mobile cellular telephone typically has a menu structure, which is displayed on the display 14 and which a user can navigate using the user input device. One option within the menu structure is "Inclinometer". If this option is selected, the mobile telephone enters an inclinometer mode. In this mode the processor 12 operates as described below.

Figure 4A:
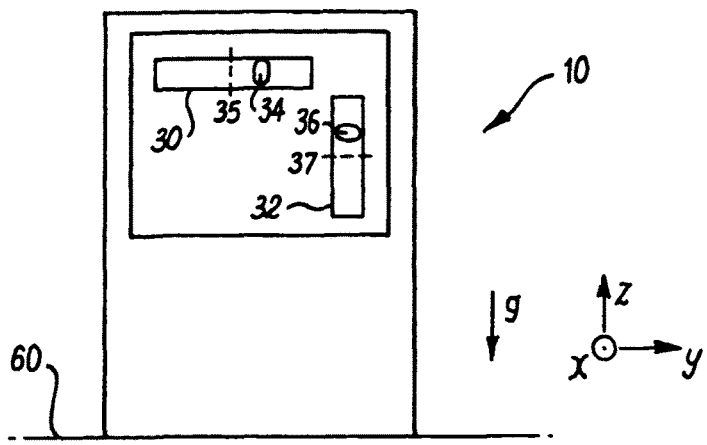
FIGS. 4A, 4B and 4C illustrate how the mobile phone displays a measurement of incline of the plane on which it is supported, for different orientations of the mobile telephone.
Figure 4B:
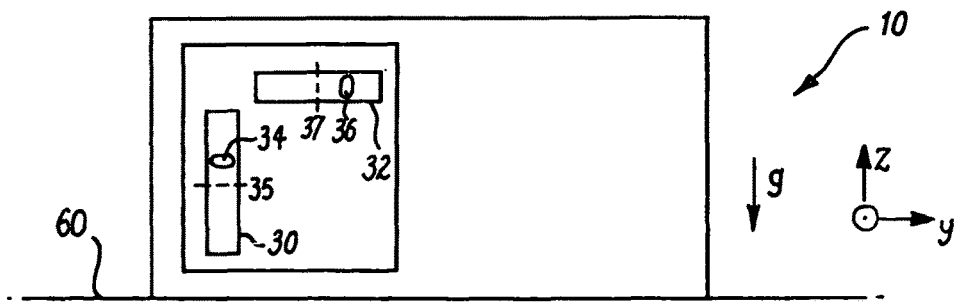
Figure 4C:
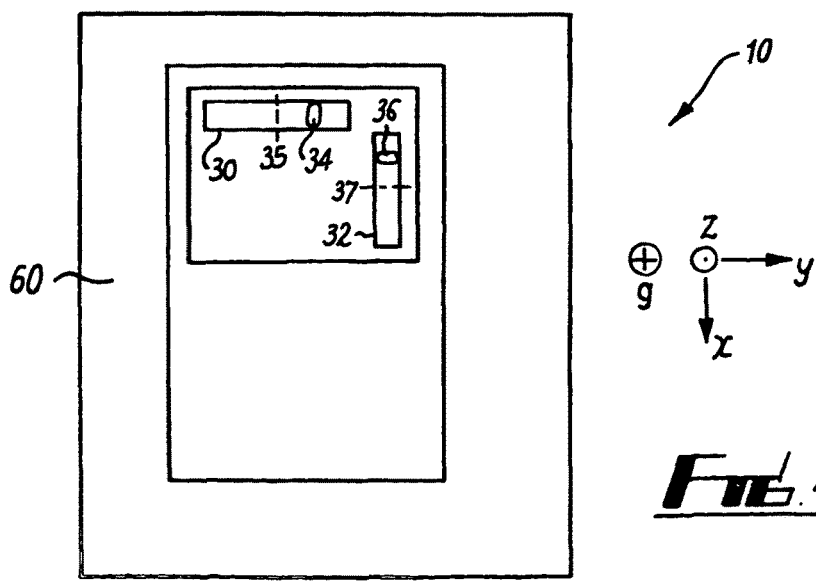

In a first embodiment, the processor 12 emulates two spirit levels on the display 14. As illustrated in FIGS. 4A, 4B and 4C, the processor, when in the inclinometer mode, controls the display 14 to display a first horizontal bar 30 and a second, separate vertical bar 32. The terms 'horizontal' and 'vertical' refer to their relative orientation in the display and not to an absolute orientation.

The position of an item 34, in this case a representation of a bubble, within the first horizontal bar 30 indicates the sense and amount of rotation about a first axis. Typically, the item 34 is positioned at a central position 35 in the horizontal bar 30 when there is zero rotation about the first axis and moves, as the mobile telephone is rotated about the first axis, from or towards the central position 35, in real-time, in a direction opposite to the direction of rotation of the mobile telephone 10.

The position of an item 36, in this case a representation of a bubble, within the vertical bar 32 indicates the sense and amount of rotation about a second axis. Typically, the item 36 is positioned at a central position 37 in the vertical bar 32 when there is zero rotation about the second axis and moves, as the mobile telephone is rotated about the second axis, from or towards the central position 37, in real-time, in a direction opposite to the rotation of the mobile telephone 10.

The processor 12 calculates, from an input received from the incline sensor 16, offset values i and j. The value i may have a positive or negative value and specifies the displacement of the item 34 to the right of the central mark 35 in the horizontal bar 30. A positive value is represented on the display 12 by a positive displacement of item 34 to the right of the central mark 35 and a negative value is represented by a displacement to the left. The value j may have a positive or negative value and specifies the displacement of the item 36 above the central mark 37 in the vertical bar 32. A positive value is represented on the display 12 by a positive displacement of the item 36 above the central mark 37 and a negative value is represented by a displacement below.

Thus the direction and amount of offset of an item from the central position indicates the direction and amount the mobile telephone should be rotated to return it to zero rotation.

FIGS. 4A, 4B and 4C respectively illustrate how the mobile phone display 12 is used to measure or correct an incline of a plane surface 60 that supports the mobile telephone, for different orientations of the mobile telephone 10. The direction of gravity is indicated by g and the major axis of an operational incline sensor is indicated by z.

In FIG. 4A, the mobile telephone 10 is oriented upright and its 'tail-end' is resting on a surface 60. The major axis z of the operational incline sensor, for this orientation, is parallel with the displayed vertical bar 32, so that at a level position the major axis z is parallel with g. The displayed horizontal bar 30 indicates rotation about an x axis and the displayed vertical bar 32 indicates rotation about a y axis, where $\underline{z}=\underline{x}\times\underline{y}$. That is z is the vector cross product of x and y. The x axis is perpendicular to the plane of the display 14 and the y axis is perpendicular to the x axis and the major axis z. The operational incline sensor 16 detects the incline of the surface 60. The surface 60 may be brought level by changing its inclination until the items 34, 36 are located at their respective central marks 35, 37.

In FIG. 4B, the mobile telephone 10 is oriented sideways and its 'side' is resting on a surface 60. The major axis z of the operational incline sensor 16, for this orientation, is parallel with the displayed horizontal bar 30, so that at a level position the major axis z is parallel with g. The displayed horizontal bar 30 indicates rotation about a y axis and the displayed vertical bar 32 indicates rotation about an x axis, where $\underline{z}=\underline{x}\times\underline{y}$. The y axis is parallel with the vertical bar 32 and the x axis is perpendicular to the y axis and the major axis z. The operational incline sensor 16 detects the incline of the surface 60. The surface 60 may be brought level by changing its inclination until the items 34, 36 are located at their respective central marks 35, 37.

In FIG. 4C, the mobile telephone 10 is oriented flat and its 'back' is resting on a surface 60. The major axis z of the operational incline sensor 16, for this orientation, is orthogonal to the displayed horizontal bar 30 and the displayed vertical bar 32, so that at a level position the major axis z is parallel with g. The displayed horizontal bar 30 indicates rotation about an x axis parallel with the vertical bar 32 and the displayed vertical bar 32 indicates rotation about a y axis parallel to horizontal bar 30, where $\underline{z}=\underline{x}\times\underline{y}$. The operational incline sensor detects the incline of the surface 60. The surface 60 may be brought level by changing its inclination until the items 34, 36 are located at their respective central marks 35, 37.

FIGS. 4A, 4B and 4C illustrate three applications of the invention. Each application uses the mobile telephone 10 in a different orientation to measure the incline of a plane and each requires a particularly aligned incline sensor 16 to do this. Different mobile telephones 10 may comprises different ones of the necessary incline sensors 16. One mobile telephone 10 may have only a single incline sensor 16 and is consequently on usable in only one of 'upright', 'sideways' and 'flat' orientations illustrated respectively in FIGS. 4A, 4B and 4C depending upon the orientation of the major axis z of the incline sensor in the mobile telephone 10.

Another mobile telephone 10 may have three incline sensors and be able to be used 'upright', 'sideways' or 'flat' to measure inclined planes. The user may, after selecting the 'Inclinometer' option from the menu be asked to select the orientation of the phone when resting on the plane whose inclination is to be measured. Thus, there may be user selectable options 'upright', 'sideways' and 'flat'. Selection of an option enables the incline sensor 16 that has a major axis perpendicular to the plane to be measured, when there is zero incline. Alternatively, the processor 12 may automatically select one of the three incline sensors to be operational. The processor 12 selects the incline sensor 16 that provides an output within predetermined limits as operational.

Figure 5:
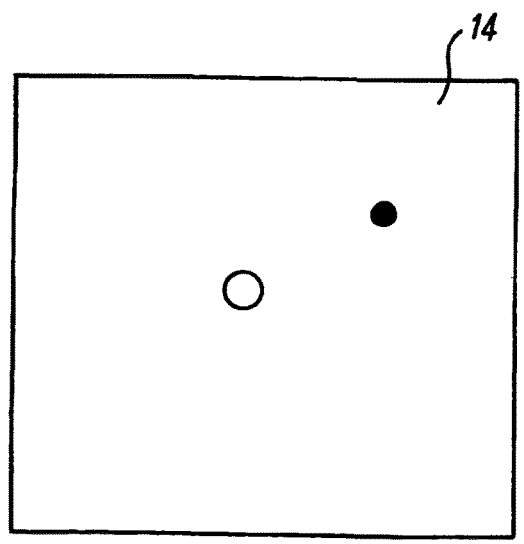
FIG. 5 illustrates an alternative way of displaying the amount and sense of an incline of a plane on the display.

FIG. 5 illustrates an alternative way of displaying the amount and sense of an incline of a plane on the display 14. In the preceding example, the processor would calculate a value i that may have a positive or negative value and specifies the displacement of the item 34 to the right of the central mark 35 in the horizontal bar 30. The processor also calculates a value j that may have a positive or negative value and specifies the displacement of the item 36 to above the central mark 37 in the vertical bar 32. In this example, the processor still calculates the values i and j but positions a single item 60 at position (i, j) in the display. The processor also display a central 'target' 62 over (0,0). The vector displacement of the item 60 from the target 62 indicates the amount and sense of incline of the surface 60 supporting the mobile telephone 10. As the surface 60 is brought level, the item moves, in real time, towards the target. When it reaches the target the plane is level in both dimensions.

Although embodiments of the present invention have been described in the preceding paragraphs with reference to various examples, it should be appreciated that modifications to the examples given can be made without departing from the scope of the invention as claimed. For example, although both a vertical bar 32 and a horizontal bar 30 are described above, in other implementations there may be a vertical bar only or a horizontal bar only. In other implementations the horizontal and vertical bars may overlap, for example, forming a + shape.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. A mobile cellular telephone comprising:
a processor configured to control the operation of the mobile cellular telephone and a display of the mobile cellular telephone; and
an incline sensor configured to detect inclination of the mobile telephone in a first plane, wherein the mobile cellular telephone has an inclinometer mode, in which the processor is configured to receive an indication of the detected incline in the first plane from the incline sensor and control the display to display, to a user of the mobile telephone, a bar and an item, at a position within the bar, dependent upon the received indication, wherein the position of the item within the bar provides an indication to the user of the incline of the mobile cellular telephone in the first plane, and wherein the processor is configured to position the item at a central location within the bar when the inclination of the mobile cellular telephone in the first plane is substantially zero, and wherein the display has a first area and the bar has a second area, the second area being smaller than the first area, and wherein the mobile cellular telephone is configured to be useable as a practical tool.

* * * * *